(12) United States Patent
Seo et al.

(10) Patent No.: US 8,176,103 B2
(45) Date of Patent: May 8, 2012

(54) FILE ACCESS METHOD AND SYSTEM

(75) Inventors: Sung-Jong Seo, Suwon-si (KR); Seung-woo Ryu, Seoul (KR); Il-hoon Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 12/379,942

(22) Filed: Mar. 4, 2009

(65) Prior Publication Data

US 2010/0138406 A1 Jun. 3, 2010

(30) Foreign Application Priority Data

Mar. 12, 2008 (KR) ........................ 10-2008-0023008

(51) Int. Cl.
*G06F 12/00* (2006.01)
*G06F 17/30* (2006.01)

(52) U.S. Cl. ...................................................... 707/822

(58) Field of Classification Search ........................ None
See application file for complete search history.

(56) References Cited

U.S. PATENT DOCUMENTS 5,715,455 A * 2/1998 Macon et al. ........................ 1/1
5,809,295 A * 9/1998 Straub et al. ........................ 1/1

FOREIGN PATENT DOCUMENTS

| JP | 2005-250982 | 9/2005 |
|---|---|---|
| JP | 2006-309400 | 11/2006 |
| JP | 2006-309536 | 11/2006 |
| JP | 2007-179286 | 7/2007 |
| KR | 2003-0063917 | 7/2003 |
| KR | 2004-0025991 | 3/2004 |
| KR | 2006-0056626 | 5/2006 |

OTHER PUBLICATIONS

Kjoernes, "File Allocation Table: How It Seems to Work," Department of Computer Science, Drexel University, 2000 <https://www.cs.drexel.edu/~wmm24/cs370/resources/File%20Allocation%20Table.pdf>.*

* cited by examiner

*Primary Examiner* — Pierre Vital
*Assistant Examiner* — Rachel J Lee
(74) *Attorney, Agent, or Firm* — Staas & Halsey LLP

(57) ABSTRACT

Disclosed is a file accessing method of a file system which manages data by a block unit of a fixed size having an index and provides information associated with a file via a plurality of entries having an index and linked information of each of blocks forming the file. The file accessing method includes providing a hint information area to each of the plurality of entries so as to record an access mode or continuous allocation information for the file, allocating the plurality of blocks to record contents of the file, and recording the access mode in each of the hint information areas of entries corresponding to a first chain group of the allocated blocks and the continuous allocation information in the hint information area of at least one entry corresponding to a second chain group of the allocated blocks.

27 Claims, 7 Drawing Sheets

FILE ACCESS METHOD AND SYSTEM

CROSS-REFERENCE TO RELATED APPLICATIONS

This application claims the benefit under 35 U.S.C. §119(a) of Korean Patent Application No. 10-2008-0023008, filed on Mar. 12, 2008, the disclosure of which is incorporated herein in its entirety by reference.

BACKGROUND

1. Field

One or more embodiments within the following description relates to a file access method and system, and more particularly, to an access method and system capable of increasing a search speed for file access while retaining compatibility with file systems using cluster chains.

2. Description of the Related Art

In general, operating systems (OSs) may use a file system to manage data within a file access system where it is installed. The file system may be a logical structure that is typically constructed primarily to manage files. For example, in a Microsoft Windows series of software operating systems, a format command may be used to organize and initialize the file system. After the file system is made, a user enables storing or deleting of files. Types of file systems are classified variously according to the operating system (OS). The example Microsoft Windows series of operating systems use file systems such as a File Allocation Table (FAT) and New Technology File System (NTFS). In another example, a series of Unix/Linux operating systems use file systems such as Unix File System (UFS), Extended 2 (EXT2), Extended 3 (EXT3), and Journaling File system (JFS). Some of the above-described file systems may provide various additional functions such as data coding, data compression, and the like.

Conventional file systems used to store and manage files are roughly classified into two data space categories, a data space in which actual data of a file is stored, and an information space in which control information associated with the file is stored. Attribute, right/permissions, name, and location information of a file is stored in the information space. The information space may include a File Allocation Table (FAT) area indicating file attribute. The FAT space is data that is used to manage a cluster, the cluster being a defined access unit for data spaces. The cluster, for example, is a logical unit that is organized to manage a plurality of sectors, in one block unit. If a format operation is executed by use of a format program in an operating system of the example Microsoft Windows series of operating systems, in general, one cluster is set to have a size of 4 Kbyte. Thus, since a sector has a size of 512 Byte, here, one cluster is formed of eight sectors. It is possible to reduce the amount of data that is needed to manage files, by managing sectors according to such a cluster block unit. In a file system, the FAT space may contain status values of clusters for configuring one or more files. That is, the FAT space includes FAT entries. Locations in files or a data space of a directory by FAT entries may be expressed by linked lists. Each of the FAT entries contains a number indicating the next cluster. If one cluster is searched in this manner, the next cluster may be accessed by acquiring the stored location information. In order to sequentially access a cluster chain, a processing unit such as a central processing unit (CPU) may read a shared cluster number of a next cluster constituting a chain to obtain allocation information of each cluster from a FAT entry. And then, the processing unit may confirm whether a current cluster accessed is a last cluster of a cluster chain constituting a file. That is, whenever the processing unit recognizes each FAT entry, it may judge whether the recognized cluster is an End Of Cluster (EOC). If not, the file system may access the next cluster linked with the current cluster with reference to linked information of the respective FAT entry. If the recognized cluster is judged to be EOC, the file system may then perform a read or write operation with respect to another file that is access requested, for example.

As described above, a file system using a cluster chain does not support continuous allocation information of clusters. That is, allocation information of a cluster chain is based upon a cluster status value of a FAT entry corresponding to each cluster. Thus, existing file systems may search all FAT entries regardless of any continuation of clusters in order to search for the end of the respective file. In the case where a has a large content, such as a moving picture or voice source data, the load on a processing unit and the resultant physical input/output time of the corresponding storage device may be increased remarkably compared to smaller files with fewer clusters, for example, due to read and comparison operations for searching all FAT entries. In order to read a chain having hundreds of continuous clusters, read and comparison operations for each FAT entry are repeated hundreds of times. Read and comparison operations for one FAT entry accompany a branch instruction in a processing unit such as an ARM processor. The branch instruction interrupts normal flow of a pipeline, so performance of a processing unit is further lowered. In other words, in the case of a file system using cluster chains, read and comparison operations of FAT entries result in the lowering of a corresponding system's performance. Thus, in case of all systems adopting a file system using a cluster chain, there is a need to reduce the physical input/output number of storage devices and reduce the number of access operations to a FAT entry corresponding to a branch instruction.

SUMMARY

One or more embodiments within the following description relates to a method and system capable of improving performance of a file system when using cluster chains.

According to an aspect, one or more embodiments include a file accessing method of a file system which manages data by a block unit of a fixed size having an index and which provides information associated with a file through a plurality of entries having an index and linked information of each of one or more of the block units making up the file, the file accessing method including assigning a hint information area to each of the plurality of entries so as to record an access mode or continuous allocation information for the file, allocating the one or more block units to record contents of the file, and recording one of the access mode, in each of respective hint information areas of entries corresponding to a first chain group of the one or more allocated block units, and the continuous allocation information, in a hint information area of at least one entry corresponding to a second chain group of the one or more allocated block units.

According to an aspect, one or more embodiments include a FAT managing method of a file system using a cluster chain, including storing hint information for continuous clusters in at least one of plural FAT entries, each FAT entry corresponding to the clusters, and acquiring linked information of each of the clusters with reference to the hint information detected from the at least one FAT entry.

Additional aspects and/or advantages will be set forth in part in the description which follows and, in part, will be apparent from the description, or may be learned by practice of the invention.

It is to be understood that both the foregoing general description and the following detailed description are exemplary and explanatory and are only intended to provide further explanation of embodiments of the invention as claimed.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1A:
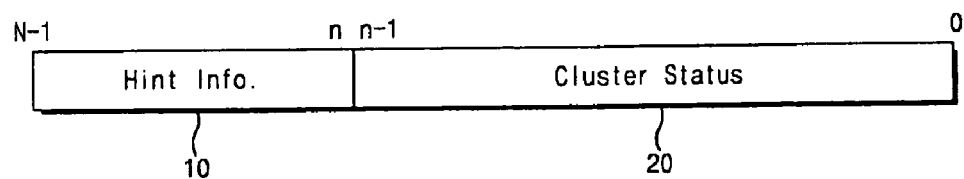
FIG. 1A is a schematic diagram showing a FAT entry structure according to an embodiment.

Reference will now be made in detail to the embodiments, examples of which are illustrated in the accompanying drawings, wherein like reference numerals refer to the like elements throughout. Embodiments of the present invention may, however, be embodied in many different forms and should not be construed as limited to the exemplary embodiments set forth herein. The embodiments are described below to explain the present invention by referring to the figures.

In addition, below, characteristics and functions of one or more embodiments of the present invention will be described with reference to a file system, for example, FAT32. However, it is well understood to one skilled in the art that different advantages and performance of embodiments of the present invention may be obtained according the below. Herein, a continuous cluster or a continuous cluster chain indicates clusters having continuous indexes. For example, the case where an interconnected and continuous cluster chain is sequential, such as '1-2-3-4-5-6', is defined as a continuous cluster or a continuous cluster chain. On the other hand, the case wherein a difference between indexes of chain clusters is greater than 1, such as '1-3-6-9-16-25, is defined as a non-continuous cluster or a non-continuous cluster chain.

FIG. 1A is a schematic diagram showing a FAT entry structure according to an embodiment. Referring to FIG. 1A, the FAT entry of the current embodiment may include a hint information space 10 and a cluster status space 20. The hint information space 10 may contain validity verify data (VVD) or the number of continuous clusters, and the cluster status space 20 may contain cluster attribute or the number of a next cluster.

The hint information space 10 may store VVD indicating a file system according to an embodiment. The VVD may be information that is used to check whether or not to search a cluster chain according to a file management method according to the current embodiment or whether or not to search a cluster chain according to a manner used in a conventional file system (e.g., FAT32). The validity verify data may indicate an access mode to a file or directory. Thus, the term 'validity verify data' may be used simultaneously with an access mode. Further, continuously allotted cluster information may be recorded at the hint information space 10 of any ones of the FAT entries. That is, the number of continuously allotted clusters may be recorded by use of the hint information space 10. In a case where information of the validity verify data or the number of continuously allotted clusters is not recorded, the hint information space 10 may be reserved. Upon a checking of validity verify data of the hint information space 10, firstly read from FAT entries, a file system may recognize a FAT entry is organized by a format according to an embodiment. With a method of managing FAT entries according to an embodiment, it is possible to obtain assignment information of continuously allotted cluster chains by only reading hint information from a FAT entry once. That is, the above-described hint information may provide the entire linked information of continuously allotted clusters only by information read from some, e.g., without all, of the FAT entries of a cluster chain.

Figure 1B:
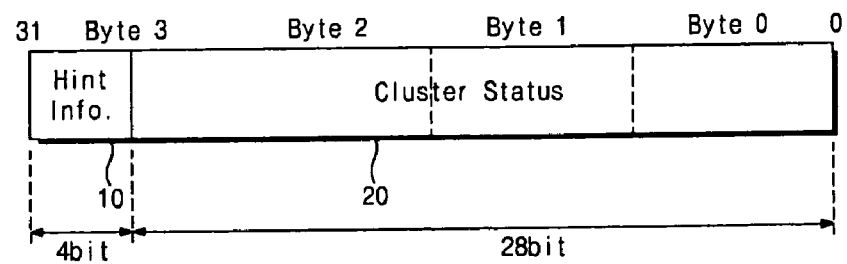
FIG. 1B is a schematic diagram showing an exemplary embodiment of a FAT32 file system in FIG. 1A.

FIG. 1B is a schematic diagram showing an exemplary embodiment of a FAT32 file system in FIG. 1A. Referring to FIG. 1B, one FAT entry of a FAT32 file system may be formed of 4 bytes, that is, 32 bits. In the case of hexadecimal, the FAT entry indicating each cluster may be expressed from '0x00000000' to 0x0FFFFFFF'. The following Table 1 shows an exemplary FAT entry in the FAT32 file system.

TABLE 1

| FAT32 | Description |
| --- | --- |
| 0x00000000~0x00000001 | 0: media type<br>1: partition state |
| 0x00000002~0x0FFFFFEF | Each indicating a number of a next cluster |
| 0x0FFFFFF0~0x0FFFFFF6 | Reserved |
| 0x0FFFFFF7 | Bad cluster |
| 0x0FFFFFF8~0x0FFFFFFF | EOF, EOC |

With the above FAT entry, each of the 28 lower bits indicates a number of a next cluster connected to a current cluster. However, in the FAT32 file system, $0^{th}$ and $1^{st}$ clusters are not used as continuous cluster status information. The $0^{th}$ cluster indicates a media type, and the $1^{st}$ cluster indicates a partition state. A cluster area '0x0FFFFFF0~0x0FFFFFF6' is used as a reserved area, and a cluster '0x0FFFFFF7' is used to indicate a bad cluster. A cluster area '0x0FFFFFF8~0x0FFFFFFF' is used to indicate End Of File (EOF) or End Of Cluster (EOC). In FAT entries corresponding to most clusters, 28 lower bits are used to indicate a number of a next cluster connected in series to a current cluster. That is, 28 lower bits of a FAT entry from '0x00000002' to '0x0FFFFFFEF' are used as linked information of a cluster.

However, as illustrated in the Table 1, in this embodiment, under any circumstances, four upper bits of a FAT entry are marked by '0' and are not used. A file system of an embodiment may assign the unused upper bit area to a hint information area.

Returning to FIG. 1B, three bytes Byte0 to Byte2 and some bits (e.g., 4-bit) of one upper byte are used as cluster state information. That is, 28 lower bits are used to record a number of a next cluster linked to make a cluster chain. Four most significant bits are allotted to the hint information area 10 where hint information of an embodiment is recorded.

Herein, a FAT entry according to an embodiment is described with reference to a FAT32 file system. However, it should be obvious to one skilled in the art that the present invention is not limited to this disclosure.

A method of recording hint information according to an embodiment is described with reference to FIGS. 1A and 1B. Here, it is possible to provide linked information of a plurality of continuous clusters by way of hint information recorded in a FAT entry according to the current embodiment.

Figure 2:
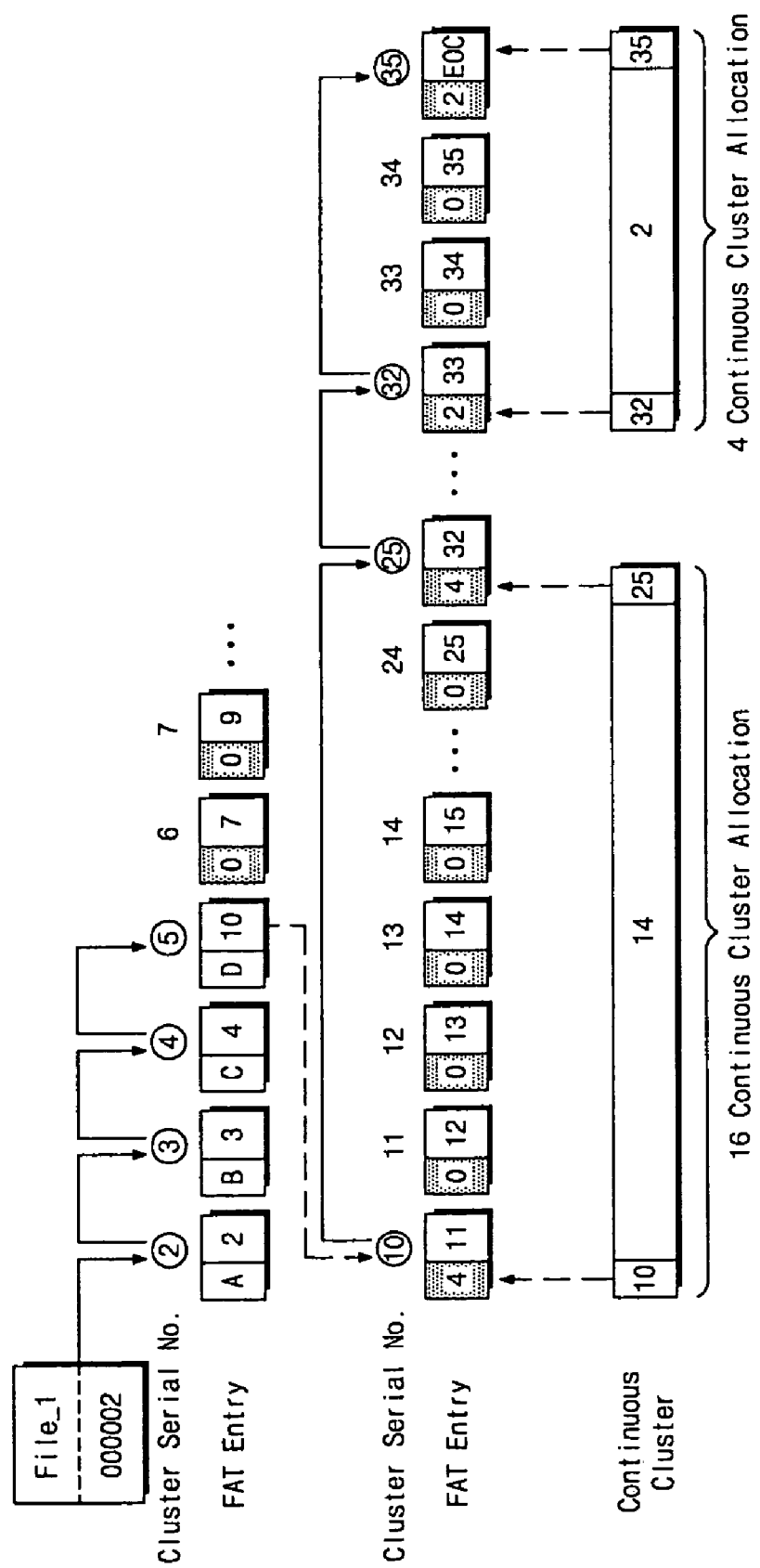
FIG. 2 is a diagram showing organization of a FAT space of FAT entries according to an embodiment.

FIG. 2 is a diagram showing organization of a FAT space of FAT entries according to an embodiment. Referring to FIG. 2, hint information and cluster status information, that is, a continuous cluster number, are recorded in each FAT entry. In particular, validity verify data is recorded in a hint information area of each of first four FAT entries.

Herein, for ease of expression, hint information is expressed by a hexadecimal number, and a continuous cluster number of a cluster status information area is expressed by a decimal number.

A file system may search a FAT area in order to obtain linked information of clusters corresponding to a file File_1. In particular, the file system may read a FAT entry of a second cluster, as an initial cluster to search a FAT entry. A hint information area of each of four searched FAT entries may include VVD. Here, 0xA, 0xB, 0xC and 0xD may be VVD recorded in respective hint information areas of FAT entries, each corresponding to second, third, fourth and fifth clusters, respectively. VVD entries 0xA, 0xB, 0xC and 0xD are exemplary and may be changed as needed. The file system may check whether clusters of the file File_1 are formed by a FAT entry according to an embodiment. If the verification is completed, the file system may shift to a tenth FAT entry (a FAT entry corresponding to a tenth cluster) based upon cluster status information (or, linked information) recorded in a FAT entry corresponding to a fifth entry, for example. Hint information of 4 is recorded in a hint information area of a FAT entry corresponding to the tenth cluster. The number of the hint information area indicates validity verify data or the number of clusters (or, a cluster chain number) continuously allotted from a current cluster. The number of clusters continuously allocated from the current cluster can be directly recorded as the number of continuous clusters. However, continuous assignment information is able to be expressed by an exponent with respect to a power of 2, in order to easily represent a file of a large volume such as media data. In FIG. 2, that the number of continuously allotted clusters is 4, which means that $2^4$ clusters are sequentially assigned from the tenth cluster. That is, $10^{th}$ to $25^{th}$ clusters are sequentially assigned to assign 16 continuous clusters. Thus, the file system reads a FAT entry corresponding to the $10^{th}$ cluster to recognize that $19^{th}$ to $25^{th}$ clusters are continuously assigned. Here, thus, it is unnecessary to read FAT entries each corresponding to $11^{th}$ to $24^{th}$ clusters.

With the above description, the file system of the current embodiment may enable the processing device to skip read and comparison operations, generated whenever FAT entries are read, with respect to continuous clusters. As read and comparison operations of FAT entries of continuous clusters corresponding to a branch instruction may be skipped, access performance to a storage device is remarkably increased over conventional systems.

Again, the file system may recognize whether the $10^{th}$ to $25^{th}$ clusters are sequentially linked, based upon hint information (or, continuous assignment information) of a FAT entry corresponding to the $10^{th}$ cluster. This enables the file system to directly shift from the $10^{th}$ FAT entry to the $25^{th}$ FAT entry. The $25^{th}$ FAT entry corresponding to the last cluster of a continuous cluster chain may have the same hint information as the $10^{th}$ FAT entry corresponding to the first cluster of the continuous cluster chain. That is, hint information of a first FAT entry of a continuous cluster chain is identical with that of a last FAT entry thereof. It is also possible to do a reverse seek operation between the first and last FAT entries of a continuous cluster chain having the same hint information. In the case where a hint information area of a FAT entry corresponding to a $25^{th}$ cluster is 4, and 32 is recorded in a cluster status information area, continuation of clusters is interrupted at the $25^{th}$ cluster and a $32^{nd}$ cluster follows. The number of 2 is recorded in a hint information area of a FAT entry corresponding to the $32^{nd}$ cluster. This means that other clusters of $2^2$ are continuously assigned from the $35^{th}$ cluster to form the above-described file File_1. FAT entries may be recorded such that continuation of four clusters from $32^{nd}$ to $35^{th}$ is recognized. The number of 2 is recorded in a hint information area of a FAT entry corresponding to the $35^{th}$ cluster, and 'EOC' is recorded in a cluster status area. The EOC means that this cluster is the last cluster of the cluster chain constituting the respective file.

Herein, such a cluster chain corresponding to the example 16 clusters, that is, $10^{th}$ to $25^{th}$ clusters, will be referred to as a continuous cluster chain fragment (CCCF). Information associated with the number of continuous clusters is recorded in hint information of each of first and last FAT entries of the continuous cluster chain fragment CCCF. However, a value of '0x0' is recorded in a hint information area of remaining FAT entries except for the first and last FAT entries. Herein, the number of continuously allotted clusters recorded with hint information is expressed by a power of 2. That is, in case of expressing continuous assignment information with a power of 2, the FAT32 file system may express $2^{15}$ (i.e., 32,768) continuous cluster chains. This may express a cluster chain of 16 MByte when one cluster has a size of 512 Byte. If a cluster has a size of 4096 Byte, it is possible to express a cluster chain having a size of 128 MByte. As the number of continuous clusters is marked by a power of 2, continuous clusters having a large size are able to be expressed by a limited bit number. However, it is obvious to one skilled in the art that hint information indicates a continuous cluster number in itself instead of a power of 2.

Further, it is difficult to remarkably improve performance in the case where hint information is marked by a power of 2 to express less than 4 continuously allotted clusters. Thus, the FAT entry managing method according to the current embodiment may be applied with respect to continuous clusters which number over 4.

Figure 3:
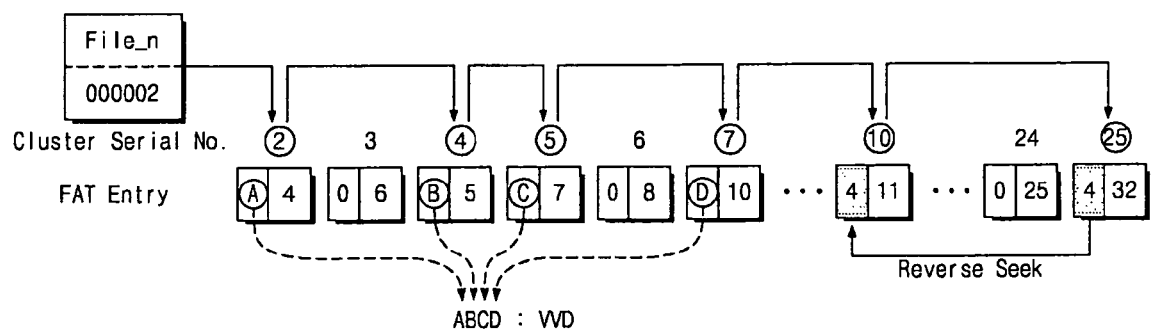
FIG. 3 is a diagram showing validity verify data (VVD) according to an embodiment.

FIG. 3 is a diagram showing validity verify data according to an embodiment. It is assumed that this VVD is recorded in the first four FAT entries as hint information.

In the following descriptions, values, such as 0xA, 0xB, etc., are exemplary and can be set to appropriate values, such as write times, noting that alternative embodiments are equally available.

With FAT entry policy, a FAT entry corresponding to a $2^{nd}$ cluster is read. Herein, a value of 0xA is recorded in a hint information area of the FAT entry corresponding to the $2^{nd}$ cluster. Cluster status information of the $2^{nd}$ FAT entry indexes a $4^{th}$ cluster, and then a FAT entry corresponding to the $4^{th}$ cluster is searched. A value of 0xB is found at a hint information area. A FAT entry corresponding to a $5^{th}$ cluster is sought by information of a continuous cluster chain, and then a value of 0xC is read from a hint information area. As a result, a FAT entry corresponding to a $7^{th}$ cluster is searched by information of a continuous cluster chain. Then, a value of 0xD is read from a hint information area. Hint information acquired from the first four FAT entries may be '0XABCD', which corresponds to VVD with respect to a file system according to an embodiment. Thus, the file system may obtain information of a continuous cluster chain with reference to hint information and use the obtained information as information for effectively managing a continuous cluster chain. If acquiring of hint information from the first four FAT entries has completed, the file system may shift into a FAT entry corresponding to a $10^{th}$ cluster, as a continuous cluster, which is recorded in the $4^{th}$ FAT entry. A value of 0x4 is recorded in a hint information area of a FAT entry corresponding to the $10^{th}$ entry. This indicates a cluster chain where $2^4$ clusters are continuously linked from the $10^{th}$ cluster. That is, $10^{th}$ to $25^{th}$ clusters constitute a continuous cluster chain fragment (CCCF). A value of 0x0 may be recorded in a hint information area of each of remaining FAT entries except for the $10^{th}$ and $25^{th}$ FAT entries of the continuous cluster chain fragment CCCF. FIG. 3 shows that it is possible to conduct a reverse seek operation at a file seek operation via hint information of a FAT entry corresponding to the $25^{th}$ cluster. That is, the file system may recognize that a continuous cluster chain fragment CCCF starts from the $10^{th}$ cluster, based upon hint information of the $25^{th}$ FAT entry.

In accordance with the above-described method, validity verify data (VVD) may be acquired. If a value of the acquired VVD is different from an initially established value, the file system may operate using a conventional file system methodology. That is, the file system would then not attempt to recognize a continuous cluster chain and would perform read and comparison operations of linked information for every cluster.

Herein, embodiments of the present invention are described under the assumption that VVD is defined by hint information acquired from first four FAT entries. However, the file system according to the current embodiment is equally able to be established to record the VVD in different FAT entries, the number of which can be greater or less than 4.

Figure 4:
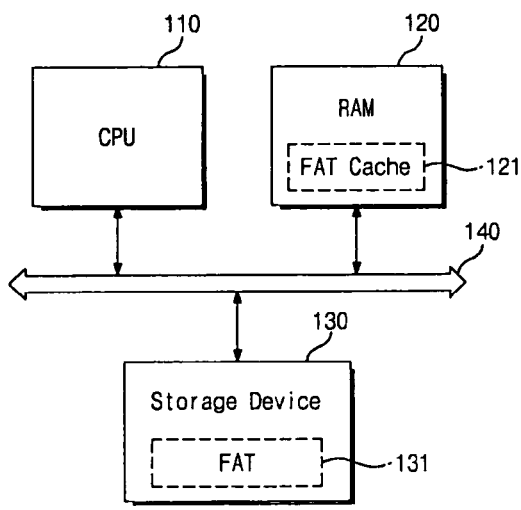
FIG. 4 is a block diagram showing a computing system according to an embodiment.

FIG. 4 is a block diagram showing a file access system, as a computing system 100, according to an embodiment. Referring to FIG. 4, the computing system 100 may include CPU 110, RAM, and a data storage device 130, which are connected to a system bus 140 to exchange data. A file system for managing data stored in the data storage device 130 may form a FAT area 131 according to a manner that is described in FIG. 2.

The CPU 110 may write or read data in or from the data storage device 130 based upon the file system. In accordance with the file system, read and comparison operations of a FAT entry is able to be skipped with continuously allotted clusters when accessing the respective clusters. Thus, it is possible to remarkably reduce the branch penalty of a pipeline due to a branch instruction that is issued to read and compare FAT entries corresponding to continuously allotted clusters. As a result, the file system may enable a minimization of cycle consumption, caused due to branch penalty in the CPU 110.

The RAM 120 may be a working memory of the computing system 100. In general, programs such as applications or/and device drivers are loaded on the RAM 120. Further, the file system may be loaded on the RAM 120 after booting. Accordingly, the RAM 120 may be used as a FAT cache 121 where FAT data of the file system is loaded.

The data storage device 130 may include a storage medium where data is written and read from according to the file system. Further, file system data for driving the file system may be previously recorded in the data storage device 130 so as to be cached on the RAM 120 at a booting operation. The data storage device 130 may include hard disk drive HDD including magnetic disk as the storage medium. Alternatively, the data storage device 130 may include a non-volatile flash memory as the storage medium where large data files may be stored. Alternatively, it will obvious to one skilled in the art that the data storage device 130 may include a solid state disk SSD using flash memories to store such large data.

The computing system 100 may manage a continuously allotted cluster chain in a manner described in FIG. 2. Although the file system is not activated, it is possible to access files or directories stored in the data storage device 130 using conventional methodologies, which can be compatible with the VVD approach. Accordingly, the file system may maintain compatibility with a conventional file system and, simultaneously, increase an access speed into the data storage device 130 compared to such a conventional file system.

Figure 5:
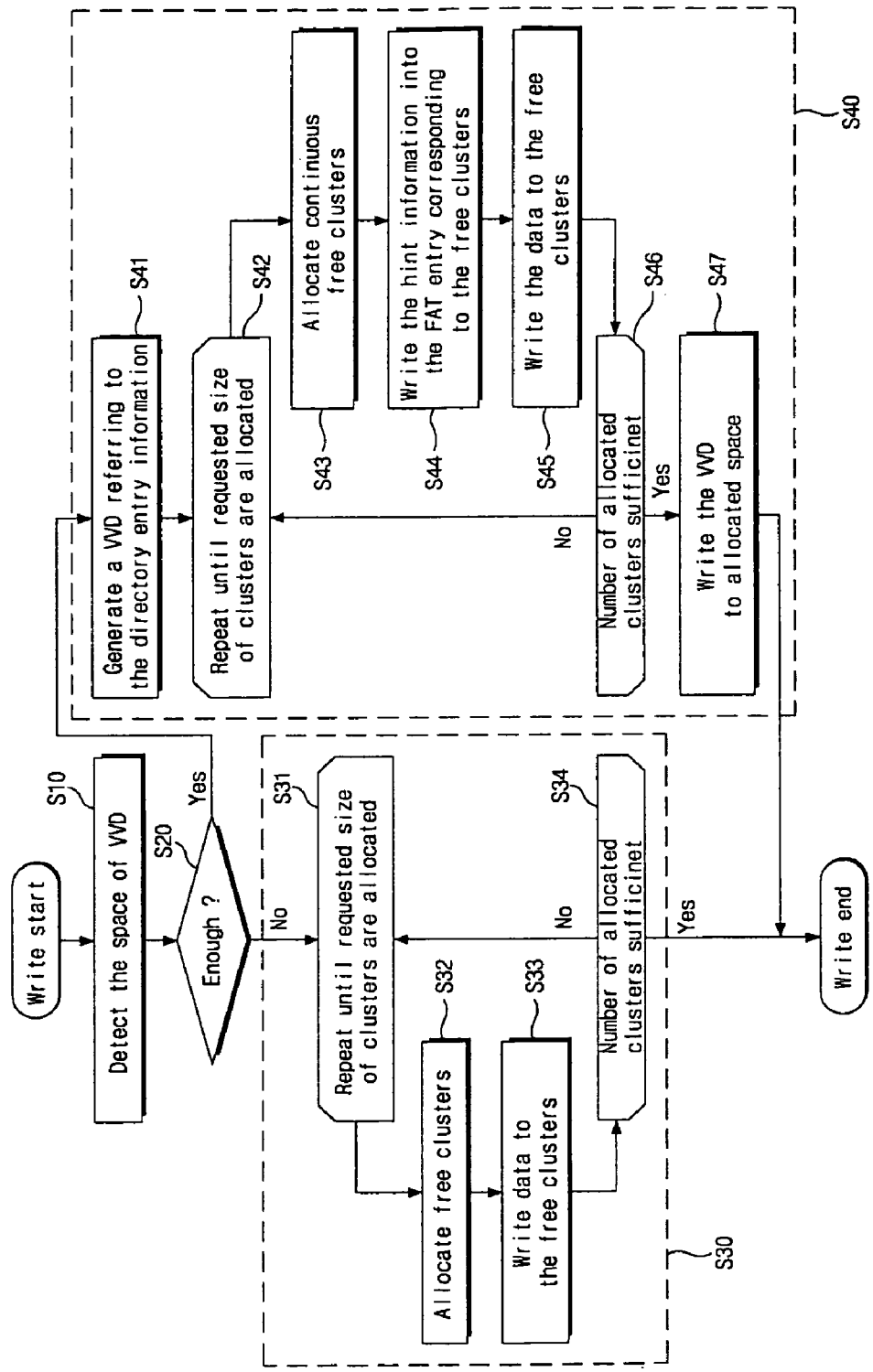
FIG. 5 is a flow chart showing a file write operation according to an embodiment.

FIG. 5 is a flow chart showing a file write operation according to an embodiment. Referring to FIG. 5, if a write operation is requested with respect to a file, a file system may seek a hint information area of a FAT entry. It is assumed that cluster allocation is needed as a write command is additionally generated with respect to a specific file. The file system may select one of a conventional FAT managing method and a FAT managing method according to an embodiment, based upon the found status of the hint information area. If an error exists at the hint information area or there is recorded a value different from VVD calculated from a conventional directory entry, data may be written according to the conventional FAT managing method. However, if the hint information area is at an unused state or a free state or there is recorded a value identical to the VVD calculated from the conventional directory entry, a cluster may be allocated according to the present FAT managing method and new VVD is recorded, which is more fully described below.

If a write operation is requested with respect to data necessitating cluster allocation, the file system may commence the requested write operation. First of all, the file system may seek a hint information area of a FAT area which validity verify data is recorded. As described above, in operation S10, it may be determined whether a hint information area of each of first four FAT entries is writable. If four hint information areas of the FAT entries are maintained to be reserved or there is recorded a value identical with VVD calculated from a conventional directory entry, then it may be determined whether there is space sufficient to record VVD, and FAT entries are managed according to the FAT managing method. On the other hand, if an error exists or there is recorded a value different from VVD calculated from a conventional directory entry, the procedure goes to operation S30, in which data is written according to a conventional FAT managing method. The conventional FAT managing method is more fully described in operation S30, and the present FAT managing method is more fully described in operation S40.

Operation S30 may include operations S31 to S34 constituting a repetition loop. That is, the operations S31 to S34 may be repeated until there are sufficient clusters having a size enough to write requested data, which is more fully described below. If possible, in operation S32, the file system may allocate continuous free clusters by a required cluster number. Then, in operation S33, a part of all of the write-required data may be recorded in the allocated clusters. If it is determined in operation S34 that the number of currently allocated clusters is less than the amount of the write-required data, the procedure goes to the operation S31 to repeat the loop where clusters are additionally allocated. If all clusters corresponding to a size of the write-required data are allocated, the procedure is ended.

However, if there exists sufficient space to record VVD in a hint information area of each of FAT entries, FAT entries and clusters are managed according to the FAT managing method according to the current embodiment. The FAT managing method is described in operation S40, which may include operations S42 to S46 constituting a repetition loop. That is, operations S42 to S46 may be repeated until there are clusters having a size enough to write requested data, which is more fully described below. First of all, at a state where a space sufficient to record VVD, the file system may generate the VVD with reference to file information in a directory entry.

Afterwards, operations S42 to S46 may be repeated until clusters of a sufficient size are allocated, in order to allocate continuous clusters and write data to the allocated clusters. In operation S32, first of all, the file system may attempt to allocate the greatest number of continuous clusters, for example. Hint information indicating the number of continuous clusters is recorded in FAT entries corresponding to allocated clusters. In a case where hint information is set by a power of 2, where a value of the hint information is used as the exponent, if allocated clusters number 256 ($2^8$), a value of 8 is recorded as hint information. Further, the above hint information is written as a pair at the FAT entry corresponding to each of first and last clusters of the continuous cluster chain. Hint information of '0' is set to the remaining FAT entries except for the first and last clusters (S44). If recording of the hint information into the FAT entry is completed, write-required data corresponding to the allocated size is recorded in continuous clusters (S45). In operation S46, it is determined whether clusters corresponding to a size of the write-required data are all allocated. The operations S42 to S46 are repeated according to the judgment result. If the size of the allocated clusters is less than the write-required data, the procedure goes to operation S42 to repeat operations S42 to S46. However, if the size of the allocated clusters corresponds to the write-required data, the repetition is ended. Then, the procedure goes to operation S47, in which the VVD is written at the first four hint information areas of FAT entries corresponding to all allocated clusters.

As well understood from the above description, the file system according to the current embodiment performs a data write operation including an operation of recording hint information (including a continuous cluster number and validity verify data) at a hint information area, when a free space exists at a hint information area. On the other hand, if no free space exists at the hint information area, the file system according to the current embodiment operates according to a conventional FAT managing method. In accordance with the FAT managing method, it is possible to increase a file access speed over conventional methodologies by providing information associated with continuously allocated clusters, while also maintaining compatibility with other file systems.

Figure 6:
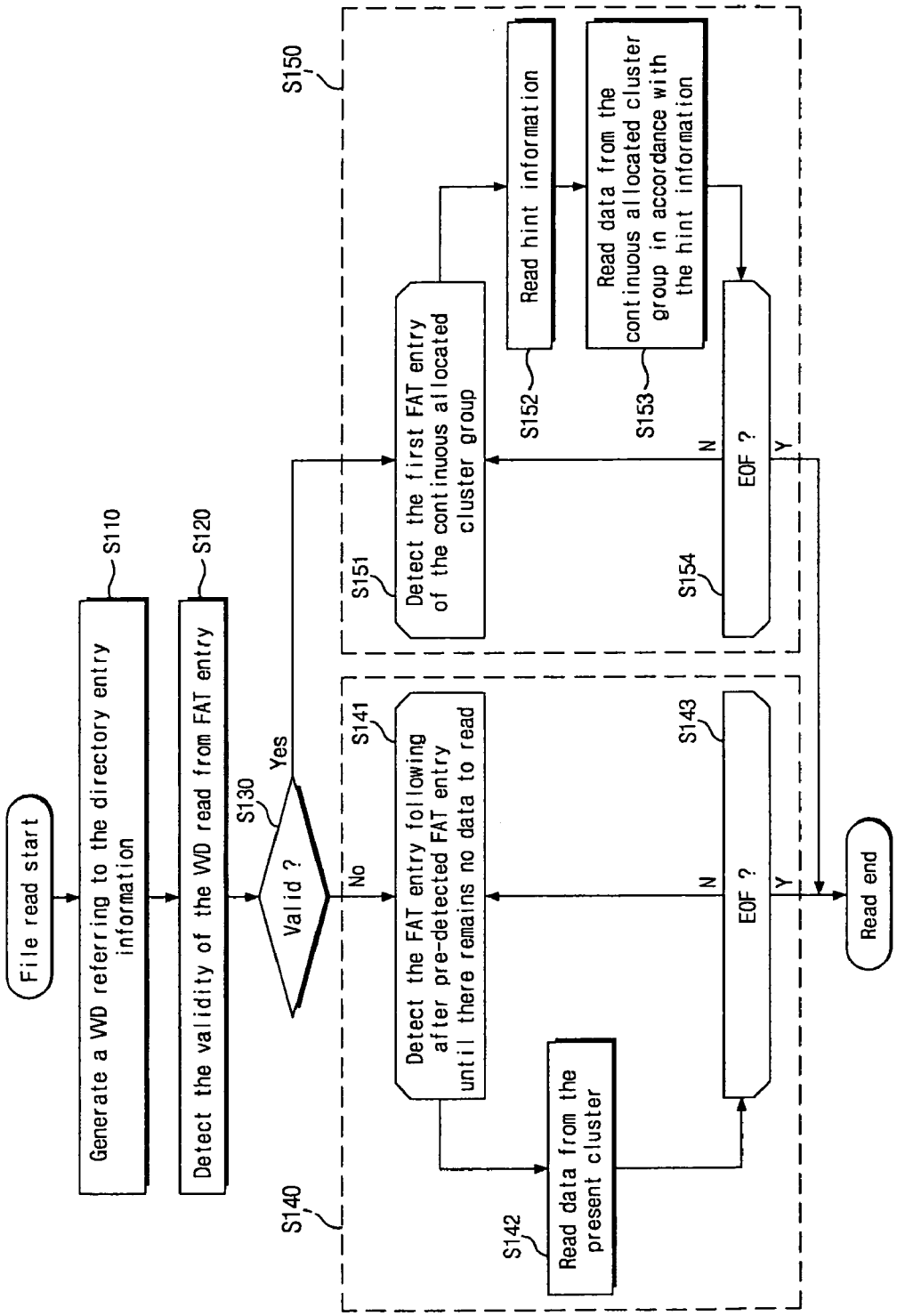
FIG. 6 is a flow chart showing a file read operation according to an embodiment.

FIG. 6 is a flow chart showing a file read operation according to an embodiment. Referring to FIG. 6, when a read operation is requested with respect to a file, a file system may seek a hint information area of a FAT entry and select one of a conventional FAT managing method and a FAT managing method according to an embodiment. If VVD detected from a hint information area is judged to be invalid, a cluster chain is formed according to the conventional FAT managing method. However, if VVD detected from a hint information area is judged to be valid, a cluster chain is formed according to the FAT managing method.

If a read operation is requested, the file system starts the required read operation. First of all, the file system may detect whether VVD in a hint information area of a FAT entry corresponding to the read-required file is valid. For this, in operation S110, the file system may generate and acquire validity verify data of a corresponding file with reference to information recorded in a directory entry. The file system accesses a FAT entry corresponding to a first cluster of the read-required file and reads hint information. As described above, it is assumed that a value of 0XABCD is recorded in hint information areas of first four FAT entries. In operation S120, the file system compares the read VVD with the generated VVD. If the read VVD is identical with the generated VVD, a continuous cluster chain is formed according to the FAT managing method, which will be described in operation S150. On the other hand, if the read VVD is not identical with the generated VVD, the file system forms a cluster chain according to the conventional FAT managing method. That is, a cluster chain is formed with reference to linked information (or, cluster status information) of FAT entries corresponding to all clusters constituting contents of the file (S130).

An example of forming a cluster chain according to the conventional FAT managing method to read a file is schematically illustrated via a loop in operation S140. In operation S141, loop initialization is conducted to configure a cluster chain corresponding to a read-required file. Then, data is read out from a cluster corresponding to a current FAT entry. If the read data is a last cluster of the read-required file, a file reading operation is ended. If the read data is not the last cluster of the read-required file, a loop is repeated to read a continuous cluster from the current cluster.

With a file reading method via the FAT managing manner, in operation S151, a first FAT entry of a continuous cluster chain is sought. Then, in operation S152, a continuous cluster number recorded in a hint information area is read. If the read hint information is 5, a cluster chain corresponding to $2^5$ including the current cluster is linked. A file is read normally by reading a corresponding cluster, without further seeking cluster status information of a FAT entry with respect to a chain of 32 clusters (S153). If the number of currently read clusters is less than a data size of the read-required file, the loop is repeated. On the other hand, if there are read clusters the number of which is over a size of the read-required file (S154).

According to the above description, the file system seeks validity verify data of a hint information area to select a FAT managing method of a continuous cluster chain. If validity verify data is judged to be invalid, a cluster accessing operation and a file reading operation are conducted according to the conventional FAT managing method. If the validity verify data is judged to be valid, hint information is read from a FAT entry corresponding to a first cluster of a continuous cluster chain, and a cluster chain is accessed to read a corresponding file.

Accordingly, it is unnecessary to read FAT entries each corresponding to all clusters constituting/making up a file. It is possible to read all data recorded in a continuous cluster chain by obtaining hint information of a FAT entry corresponding to a first cluster of the continuous cluster chain forming one fragment of the file. As a result, a read speed is increased by use of information associated with a continuous cluster allocated, and compatibility with other file systems is maintained.

Figure 7:
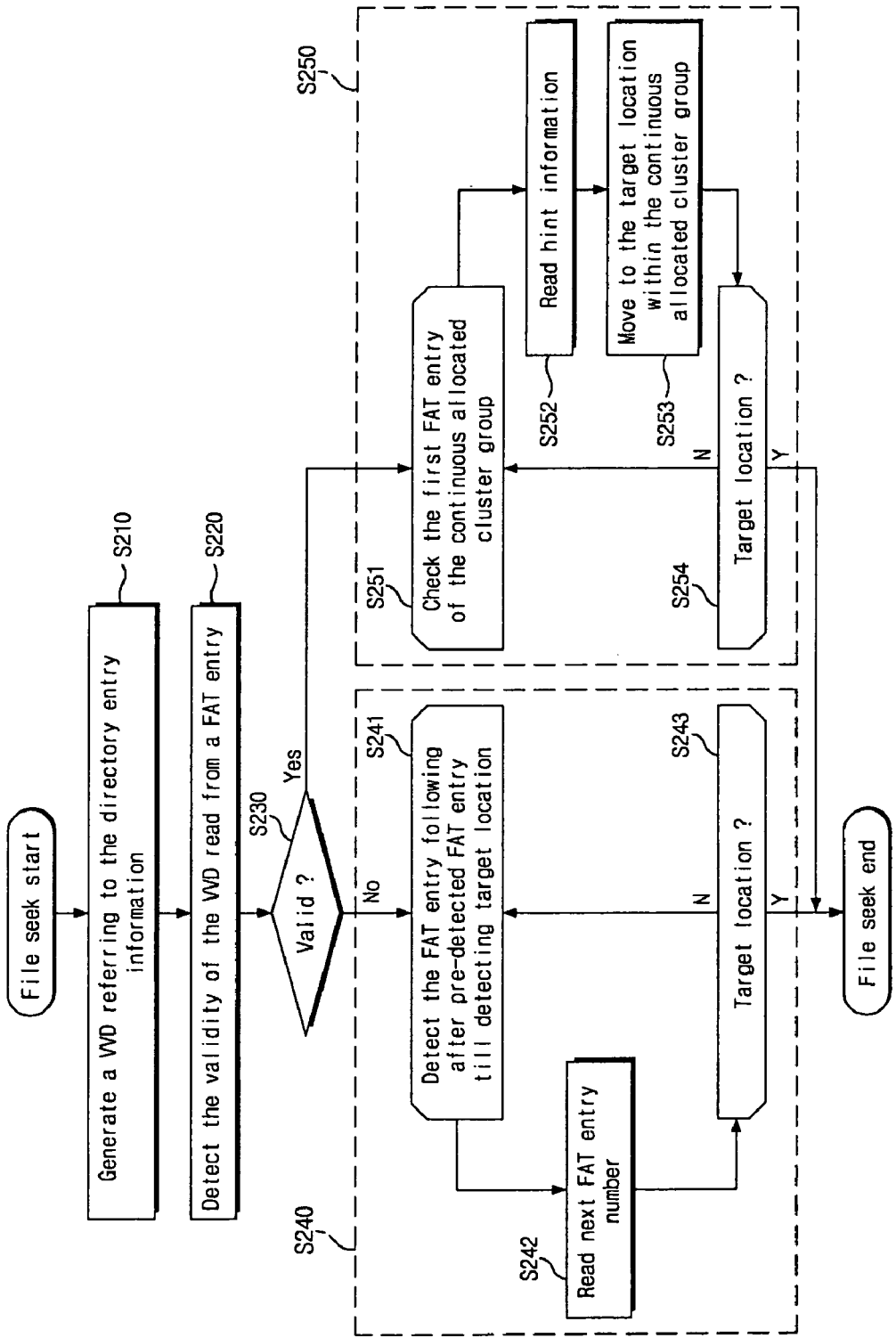
FIG. 7 is a flow chart showing a file search operation according to an embodiment.

FIG. 7 is a flow chart showing a file search operation according to an embodiment. Referring to FIG. 7, if a file seeking operation is required, a file system seeks a hint information area of a FAT entry to select one of a conventional FAT managing method and a FAT managing method according to an embodiment. If VVD detected from a hint information area is judged to be invalid, a cluster chain is formed according to the conventional FAT managing method. If VVD detected from a hint information area is judged to be valid, a cluster chain is formed according to the FAT managing method.

If a seek operation is required, the file system starts to conduct the required seek operation. First of all, the file system may detect whether VVD recorded in a hint information area of a FAT entry corresponding to the seek-required file is valid. For this, the file system may generate and acquire the VVD with reference to information recorded in a directory entry (S210). The file system may read hint information from FAT entries of first clusters corresponding to the seek-required file. The read VVD is compared with the generated validity verify data (S220). If the read VVD is identical with the generated validity verify data, the procedure goes to operation S250, in which a continuous cluster chain is formed according to the FAT managing method. On the other hand, if the read VVD is not identical with the generated validity verify data, the procedure goes to operation S240, in which a continuous cluster chain is formed according to a conventional FAT managing method (S230). This will be more fully described below.

A method of organizing and seeking a continuous cluster chain according to the conventional method is illustrated in operation S240. A seek loop for a FAT entry for seeking a target location in a file is repeated until a FAT entry corresponding to the target location is found (S241). If a current cluster is not the target location, in operation S242, there is read a FAT entry indicated by state information (or, linked information) of a FAT entry corresponding to the current cluster. If the current FAT entry is not the target location, a seek loop for a FAT entry is repeated. However, if the target location is found, a file seeking operation is ended (S243).

With the file seeking method, the file system may seek a first FAT entry of a continuous cluster chain, which is confirmed via a size of a number marked at a hint information area (S251). Then, the number of continuous clusters recorded in the hint information area is read (S252). It is possible to directly move to a seek location corresponding to a target cluster with reference to the number of continuous cluster chains thus read (S253). In a case where a location for the seek-required file is not grasped, the above-described file seeking operation is continued. If the target location is found, the procedure is completed (S254).

With the above description, the file system may seek VVD of a hint information area to select methods of managing a continuous cluster chain. If the validity verify data is judged to be invalid, a target location is sought according to a conventional method. If the validity verify data is judged to be valid, a target location is sought by reading hint information from a FAT entry corresponding to a first cluster of a continuous cluster chain. Accordingly, it is unnecessary to read FAT entries each corresponding to all clusters constituting a file in order to seek a file. It is possible to seek a target location of a continuous cluster chain by obtaining only hint information of a FAT entry corresponding to a first cluster of a continuous cluster chain forming a fragment. Thus, a seek operation is conducted in a high speed.

Figure 8:
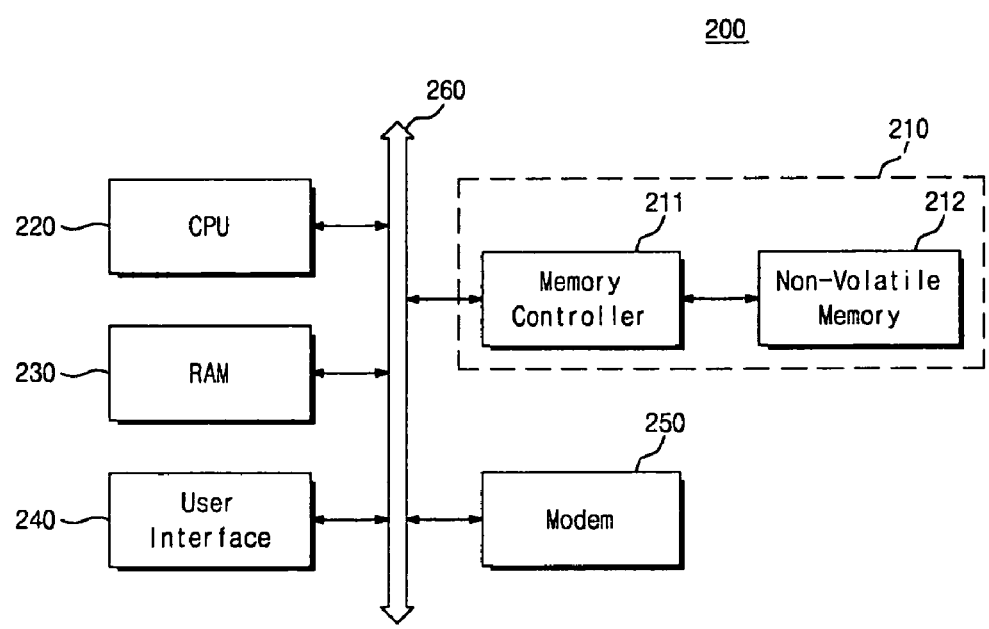
FIG. 8 is a block diagram showing an information processing system where a file system according to an embodiment is applied.

FIG. 8 is a block diagram showing an information processing system where a file system according to an embodiment is applied. Referring to FIG. 8, the file system is applied to an information processing system 220 such as mobile devices or desktop computers where a non-volatile memory device 212 is installed as a data storage device. The information processing system 200 may include a memory system 210 having a memory controller 211 and a non-volatile memory device 212, CPU 220, RAM 230, user interface 240, and modem 250 which are connected to a bus 260. The memory system 210 may be formed of a memory card or a flash memory system. The non-volatile memory device 212 may store data provided via the user interface 240 or processed by the CPU 220. Herein, data may be stored or read in or from the memory system according to a file system of an embodiment. Further, like an operation of seeking a specific location within media data, an operation for seeking a specific location of a file may be conducted in a high speed according to a FAT entry managing method of an embodiment. The above-described memory system 210 may be formed of a solid state disk (SSD). Although not illustrated, it will be obvious to one skilled in the art that the information processing system 200 may further include a application chipset, camera image processor (CIS), mobile DRAM, and the like.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A file accessing method of a file system which manages data by a block unit of a fixed size having an index and which provides information associated with a file through a plurality of entries having the index and linked information of each of one or more of the block units making up the file, the file accessing method comprising:
   assigning a hint information area to each of the plurality of entries so as to record validity verify data or continuous allocation information for the file;
   allocating the one or more block units to record contents of the file; and
   recording one of the validity verify data, in each of respective hint information areas of entries corresponding to a first chain group of the one or more allocated block units, and the continuous allocation information, in a hint information area of at least one entry corresponding to a second chain group of the one or more allocated block units,
   wherein the hint information area is assigned to an unused upper bit area of each of the plurality of entries.

2. The file accessing method of claim 1, wherein each of the block units corresponds to a cluster.

3. The file accessing method of claim 1, further comprising respectively recording a fragment of contents of the file to each of the block units after the allocating and the recording.

4. The file accessing method of claim 1, wherein the first chain group comprises a block unit set to be firstly accessed with regard to the allocated one or more block units.

5. The file accessing method of claim 1, wherein the second chain group comprises block units whose indexes are continuous.

6. The file accessing method of claim 5, wherein the continuous allocation information corresponds to a number of the continuous block units.

7. The file accessing method of claim 6, wherein the continuous allocation information corresponds to an exponent when the number of the continuous block units is expressed as a power of 2.

8. The file accessing method of claim 5, wherein the continuous allocation information is recorded in entries corresponding to an initial block unit and/or a last block unit of block units in the second chain group.

9. The file accessing method of claim 8, wherein a value of 0 is recorded in hint information areas of entries corresponding to block units between the initial and last block units.

10. The file accessing method of claim 1, further comprising:
   determining whether an access operation to block units corresponding to the file is conducted with reference to an access mode, based upon the linked information or the continuous allocation information; and
   obtaining allocation information of block units in the second chain group with reference to continuous allocation information recorded in a hint information area of at least one entry of the second chain group when the access mode is set with a value for accessing block units according to continuous allocation information.

11. The file accessing method of claim 10, wherein the at least one entry corresponds to an initial block unit of the second chain group.

12. The file accessing method of claim 10, wherein the at least one entry corresponds to a last block unit of the second chain group.

13. The file accessing method of claim 1, wherein the file system is a FAT32 file system.

14. A FAT managing method of a file system using a cluster chain, comprising:
   storing hint information for continuous clusters in at least one of plural FAT entries, each FAT entry corresponding to the clusters; and
   acquiring linked information of each of the clusters with reference to the hint information detected from the at least one FAT entry,
   wherein the hint information comprises validity verify data or continuous allocation information for a file, and is stored in a hint information area assigned to an unused upper bit area of each of the plurality of FAT entries.

15. The FAT managing method of claim 14, wherein each of the plural FAT entries includes a hint information area to record the hint information and a cluster state information area to record a respective number of the continuous clusters.

16. The FAT managing method of claim 15, further comprising allocating a reserved field of the at least one FAT entry to a hint information area storing the hint information.

17. The FAT managing method of claim 16, wherein the file system includes a FAT32 file system.

18. The FAT managing method of claim 16, wherein the storing comprises recording validity verify data in second FAT entries, of the plural FAT entries, to store the validity verify data indicating that first FAT entries, of the plural FAT entries, are FAT entries including a hint information area.

19. The FAT managing method of claim 18, wherein the validity verify data is recorded in respective hint information areas of each of the second FAT entries.

20. The FAT managing method of claim 19, further comprising generating the validity verify data with reference to a directory entry corresponding to the clusters.

21. The FAT managing method of claim 18, wherein the at least one FAT entry corresponds to an initial or last FAT entry of the first FAT entries.

22. The FAT managing method of claim 21, wherein hint information of the at least one FAT entry indicates a number of clusters continuously linked from a cluster corresponding to the at least one FAT entry.

23. The FAT managing method of claim 22, wherein the number of the continuously linked clusters is recorded as an exponent when the hint information is expressed by a power of 2.

24. The FAT managing method of claim 21, wherein a value of 0 is recorded in hint information areas of FAT entries except for the at least one FAT entry.

25. The FAT managing method of claim 18, further comprising: determining whether to confirm continuous link information of each of the clusters according to the hint information or according to the cluster state information, based upon the validity verify data.

26. The FAT managing method of claim 14, wherein the hint information is stored in at least one of the FAT entries when the number of continuous clusters is over a predetermined number.

27. A computing system comprising:
   a data storage device to store data in block units of a fixed size having an index; and
   a processing unit connected to the data storage device and to access the data storage device with a file system according to the file accessing method of claim 1.

* * * * *